March 27, 1928.
C. D. HEFFERNAN
HOSE REEL
Filed June 7, 1926
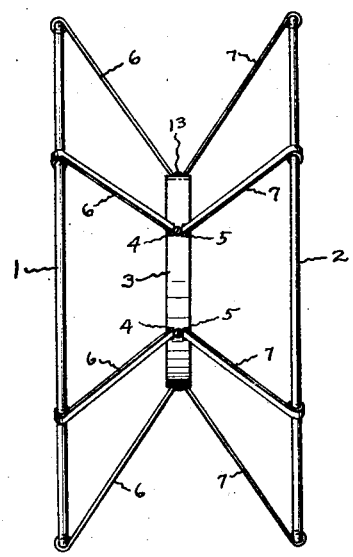
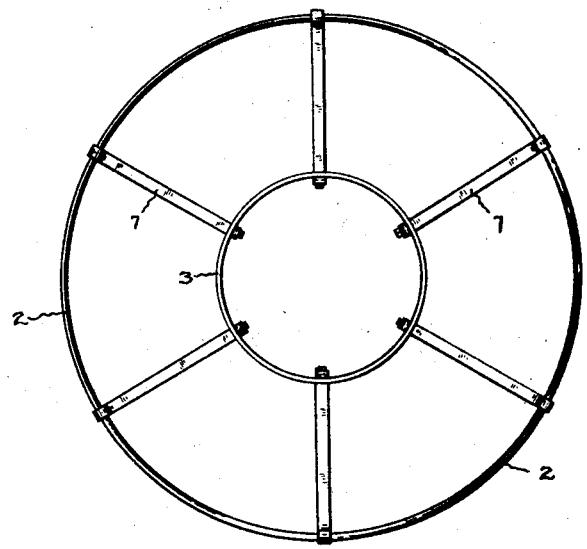
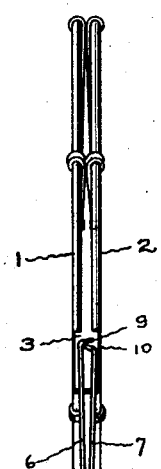
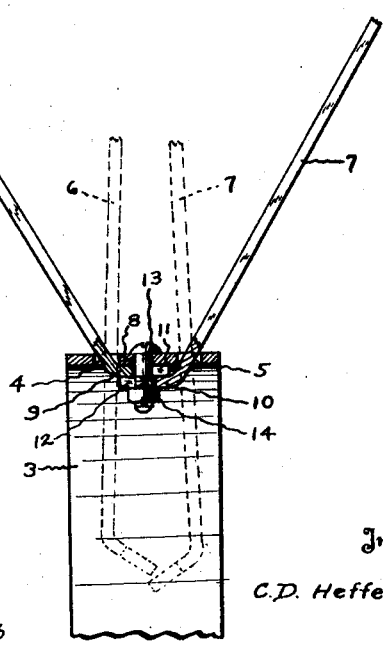
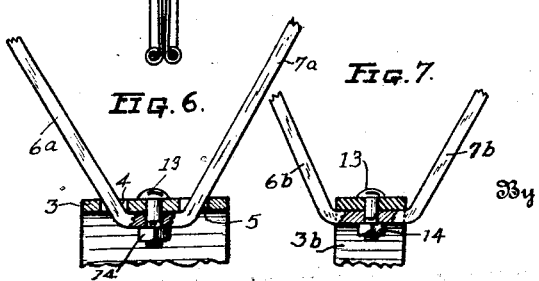
Inventor
C.D. Heffernan
By Evans and McCoy
Attorneys Patented Mar. 27, 1928.

1,664,074

UNITED STATES PATENT OFFICE.

CORNELIUS D. HEFFERNAN, OF CLEVELAND, OHIO.

HOSE REEL.

Application filed June 7, 1926. Serial No. 114,118.

This invention relates to hose reels, and more particularly to hose reels of a collapsible type.

It is frequently desirable to provide hose reels of light, economical, and readily portable construction. Preferably such reels should be rigid when in operative position, and it is very desirable that the construction of the reel be such as not to pinch or otherwise deteriorate hose carried thereon. In order that such reels may be readily shipped or stored in a minimum of space, it is very desirable that such hose reels be collapsible in such manner that the reassembly thereof to operative position may be quickly and readily accomplished.

An object of this invention is to provide a hose reel of light, simple, rigid, and readily portable construction.

Another object of the invention is to provide a hose reel which may be readily collapsed into a minimum of space and readily reassembled to operative position.

A further object of my invention is to provide a collapsible hose reel which will support hose without pinching or other deterioration thereof.

Other objects of the invention will be obvious to those skilled in the art from the description of it hereinafter given.

In the drawings:

Figure 1 is an end elevation of a collapsible hose reel contemplated by my invention, showing the reel in operative position;

Fig. 2 is a side elevation of the hose reel shown in Fig. 1;

Fig. 3 is an end elevation, partly in section, showing my improved hose reel in collapsed position;

Fig. 4 is an enlarged sectional view showing one form of assembly of the hub member and spokes;

Fig. 5 is a plan view of the inner end of one of the spokes shown in Fig. 4;

Fig. 6 is an enlarged sectional view showing a modified form of assembly of the hub member and spokes; and Fig. 7 is an enlarged sectional view of another modified form of assembly of the hub member and spokes.

Referring particularly to Fig. 1, the hose reel illustrated is shown as comprising a pair of spaced, axially aligned annular rims 1 and 2 of substantially equal diameter. The rims 1 and 2 are preferably of metal and may be of any suitable cross sectional shape. The said rims are preferably formed or bent to a circular shape such as shown in Fig. 2, but it will be understood that the rims 1 and 2 may, if desired, be bent or formed to a polygonal shape. Where the said rims are formed from wire bent to the desired shape, the ends thereof may be conveniently butt-welded to form endless rims, or said ends may be connected in any other suitable manner.

Again referring to Fig. 1, there is shown an annular hub member 3 of smaller diameter than said rims disposed intermediate said rims, in axial alignment therewith and substantially equidistant therefrom. The hub member 3 shown has a relatively wide outer periphery and a relatively thin radial section. If desired, said hub member 3 may be conveniently formed from flat bar stock bent to the desired shape and the ends thereof suitably connected, as by butt-welding. Said hub member is preferably circular in external shape though it may, if desired, be of any other desired shape. The hub member is shown as provided with a plurality of spoke receiving apertures 4 and 5 and fastener receiving apertures 8, which will be later more fully described. It will be noted that with a hollow annular hub member as described, a convenient means is provided for carrying the reel from place to place.

Attached to the rims 1 and 2 are the substantially uniformly spaced spokes 6 and 7 respectively. Each said spoke may be pivotally connected adjacent its outer end to one of said rims as by being bent substantially therearound. By such connection pivotal movement may take place between the spokes and rims when the reel is collapsed to the form shown in Fig. 3. Each spoke 6 is shown as disposed in alignment in an axial plane with a spoke 7. The said spokes, which are preferably of metal, may be of any suitable cross section.

The spoke receiving apertures are disposed in pairs, each pair comprising an aperture 4 and an aperture 5. Each said aperture is radially disposed in said hub member and each pair of apertures is disposed in alignment with and in the same axial plane as a pair of aligned spokes 6 and 7. The apertures 4 and 5 preferably conform to the shape of the spoke portions to be received therein. Between each aperture 4 and aperture 5 and in alignment therewith may be disposed a radial, securing means receiving aperture 8. The spokes 6 and 7 extend through the apertures 4 and 5 respectively, the inner ends of the said spokes being suitably shaped to cooperate with means for securing the spokes against radial movement with respect to the hub member 3 when the reel is disposed in operative position. Thus, the inner ends 9 and 10 of the spokes 6 and 7 may be bent to be substantially parallel with the adjacent inner periphery of the hub member 3. The spoke portions 9 and 10 may be provided with securing means receiving apertures 11 and 12 which are in alignment with the apertures 8 when the reel is in operative position. The outer ends of the apertures 11 and 12 may be open as shown in Fig. 5. The aligned apertures 8, 11 and 12 are adapted to cooperate with suitable securing means, such as bolts 13 and nuts 14. It is to be understood, of course, that any suitable means may be employed to secure the spokes to the hub member 3. With the aligned pairs of spokes and the securing means as shown, each pair of spokes may be secured by one securing means.

My improved hose reel may be readily collapsed for shipment or storage by removing or releasing the securing means, such as by removing the nut 14 and the bolt 13. The rims may then be moved toward each other to collapse said reel to the position shown in Fig. 3. When said rims are moved toward each other, the spokes 6 and 7 may move pivotally at their outer ends with respect to the rims 1 and 2, and the inner portions of each spoke move toward the axis of said hub member. As will be seen by reference to Fig. 3 and to the dotted portion of Fig. 4, where a hub member of relatively thin radial section is employed the said spokes are adapted to extend well beyond the inner periphery of said hub member 3 toward the axis thereof when said reel is in collapsed position. The rim may be readily reassembled to operative position by spacing the rims 1 and 2 and securing the inner ends of the spokes to the hub member 3.

It will be noted, particularly by reference to Fig. 1, that the spokes attached to the rim 1 contact with the outer periphery of the hub member 3 substantially in a plane perpendicular to the axis of said hub member, and that the spokes attached to the rim 2 contact with the periphery of the hub member 3 at points spaced from said transverse plane and nearer the rim 2, whereby a sharp notch between the inner ends of the spokes 6 and 7 is eliminated, thus preventing the pinching of hose disposed on the reel adjacent the hub member 3.

In Fig. 6 is shown a modified form of construction wherein the spokes 6ª and 7ª are integrally united adjacent their inner ends. With such construction, the spokes 6ª and 7ª are preferably of somewhat flexible material. In Fig. 7 is shown another modified form of construction, wherein the spokes 6ᵇ and 7ᵇ, which are integrally united adjacent their inner ends, cooperate with the hub member 3ᵇ adjacent the outer sides of said hub member. With such construction, no spoke receiving apertures need be disposed in the hub member 3ᵇ. With the modified forms of construction shown in Figs. 6 and 7, it will be understood, of course, that any suitable securing means may be employed other than the bolts 13 and nuts 14 shown.

It will be seen that I have provided a hose reel of simple construction which may be readily collapsed to occupy a minimum space for shipment or storage and which may be readily assembled to form, when in operative position, a light, rigid hose reel.

Furthermore, it is to be understood that the particular forms of apparatus shown and described are presented for purposes of explanation and illustration and that various modifications of said apparatus can be made without departing from my invention as defined in the appended claims.

What I claim is:

1. A collapsible hose reel comprising, in combination, a pair of spaced, axially aligned rims of substantially equal size, an annular hub member of smaller size than said rims disposed in substantial axial alignment with and intermediate said rims, a plurality of spokes each attached adjacent its outer end to one of said rims, said hub member being provided with a plurality of spaced, radial, spoke receiving apertures, each said spoke extending through a spoke receiving aperture and shaped for attachment adjacent its inner end to said hub member when said reel is in operative position, the inner end of each spoke being adapted to move toward the axis of said hub member when the rims are moved toward each other to collapse said reel.

2. A collapsible hose reel comprising, in combination, a pair of spaced, axially aligned rims of substantially equal size, an annular hub member of smaller size than said rims disposed in substantial axial alignment with and intermediate said rims, a plurality of spokes each attached adjacent its outer end to one of said rims, said hub member being provided with a plurality of spaced, radial, spoke receiving apertures, each said spoke extending through a spoke receiving aperture and shaped adjacent its inner end to cooperate with securing means to secure each said spoke to said hub member when said reel is in operative position, the inner end of each spoke being adapted to move toward the axis of said hub member when the rims are moved toward each other to collapse said reel, and means to secure said spokes to said hub member adjacent the inner periphery thereof when said reel is in operative position.

3. A collapsible hose reel comprising, in combination, a pair of spaced, axially aligned rims of substantially equal diameter, an annular hub member of smaller diameter than said rims disposed intermediate said rims, in axial alignment therewith and substantially equidistant therefrom, a plurality of substantially uniformly spaced spokes each attached adjacent its outer end to a rim, said hub member being provided with a plurality of substantially uniformly spaced, radial, spoke receiving apertures, each said spoke extending into one of said spoke receiving apertures and shaped for attachment adjacent its inner end to said hub member when said reel is in operative position, the inner end of each said spoke being adapted to move toward the axis of said hub member when said rims are moved toward each other to collapse said reel.

4. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniformly spaced spokes each attached adjacent its outer end to a rim, said hub member being provided with a plurality of substantially uniformly spaced, radial, spoke receiving apertures, each said spoke extending into one of said spoke receiving apertures and shaped adjacent its inner end to cooperate with securing means to secure said spoke to said hub member when said reel is in operative position, the inner end of each said spoke being adapted to move toward the axis of said hub member when said rims are moved toward each other to collapse said reel, and means to secure said spokes to said hub member when said reel is in operative position.

5. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniformly spaced spokes each connected adjacent its outer end to a rim, each spoke attached to one of said rims being disposed in alignment in an axial plane with a spoke attached to the other of said rims, said hub member being provided with a plurality of substantially uniformly spaced, radial, spoke receiving apertures, each said spoke extending into one of said spoke receiving apertures and shaped to be secured adjacent its inner end to said hub member when said reel is in operative position, the inner end of each said spoke being adapted to move toward the axis of said hub member when said rims are moved toward each other to collapse said reel, and means to secure said spokes to said hub member when said reel is in operative position.

6. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of spokes each attached adjacent its outer end to one of said rims, said hub member being provided with a plurality of radial, spoke receiving apertures, each said spoke extending into one of said spoke receiving apertures, said spokes being adapted to extend well beyond the inner periphery of said hub member toward the axis of said hub member when said reel is in collapsed position.

7. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniform spaced spokes each connected adjacent its outer end to a rim, each spoke attached to one of said rims being disposed in alignment in an axial plane with a spoke attached to the other of said rims, said hub member being provided with a plurality of radial, spoke receiving apertures, each said spoke extending into one of said spoke receiving apertures, said spokes being adapted to extend well beyond the inner periphery of said hub member toward the axis of said hub when said reel is in collapsed position, and means to secure each said spoke adjacent the inner end thereof to said hub member when said reel is in operative position.

8. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniformly spaced spokes each pivotally connected adjacent its outer end to a rim, each spoke attached to one of said rims being disposed in alignment in an axial plane with a spoke attached to the other of said rims, said hub member being provided with a plurality of pairs of spaced, radial, spoke receiving apertures, each pair of apertures being disposed in alignment with and in the same axial plane as a pair of aligned spokes, each said spoke extending through one of said spoke receiving apertures and shaped at its inner end to cooperate with the adjacent inner periphery of said hub member when said reel is in operative position, the inner end of each said spoke being adapted to move toward the axis of said hub member when said rims are moved toward each other to collapse said reel, and means to secure the inner end of each said spoke to the adjacent inner periphery of said hub member when said reel is in operative position.

9. A collapsible hose reel comprising, in combination, a pair of spaced, axially aligned rims of substantially equal diameter, an axial hub member of smaller diameter than said rims disposed intermediate said rims, in axial alignment therewith, and substantially equidistant therefrom, a plurality of substantially uniformly spaced spokes each pivotally connected adjacent its outer end to a rim by being bent substantially therearound, each spoke attached to one of said rims being disposed in alignment in an axial plane with a spoke attached to the other of said rims, said hub member being provided with a plurality of pairs of spaced, radial, spoke receiving apertures, each pair of apertures being disposed in alignment with and in the same axial plane as a pair of aligned spokes, each said spoke extending through one of said spoke receiving apertures and shaped at its inner end to cooperate with the adjacent inner periphery of said hub member when said reel is in operative position, the inner end of each said spoke being adapted to move toward the axis of said hub member when said rims are moved toward each other to collapse said reel, and means to secure the inner ends of each said spoke to the adjacent inner periphery of said hub member when said reel is in operative position.

10. A collapsible hose reel comprising, in combination, a pair of spaced, axially aligned rims of substantially equal diameter, an axial hub member of smaller diameter than said rims disposed intermediate said rims, in axial alignment therewith, and substantially equidistant therefrom, a plurality of substantially uniformly spaced spokes each pivotally connected adjacent its outer end to a rim by being bent substantially therearound, each spoke attached to one of said rims being disposed in alignment in an axial plane with a spoke attached to the other of said rims, said hub member being provided with a plurality of pairs of spaced, radial, spoke receiving apertures, each pair of apertures being disposed in alignment with and in the same axial plane as a pair of aligned spokes, each said spoke extending through one of said spoke receiving apertures and being bent to be substantially parallel with the adjacent inner periphery of said hub member when said reel is in operative position, said hub member being provided with a securing means receiving radial aperture disposed adjacent each pair of aligned spoke receiving apertures and intermediate said apertures, the inner bent over portions of said spokes being provided with securing means receiving apertures in alignment with the corresponding apertures in said hub member when said reel is in operative position, the inner end of each said spoke being adapted to move toward the axis of said hub member when said rims are moved toward each other to collapse said reel, and securing means adapted to be disposed in said securing means receiving apertures to secure the inner ends of each pair of spokes to said hub member when said reel is in operative position.

11. A collapsible hose reel comprising, in combination, a pair of spaced, axially aligned rims of substantially equal size, an annular hub member of smaller size than said rims disposed in substantially axial alignment with and intermediate said rims, a plurality of spokes each attached adjacent its outer end to one of said rims, each said spoke being shaped adjacent its inner end to cooperate with the adjacent inner periphery of said hub member when said reel is in operative position, the inner end of each spoke being adapted to move toward the axis of said hub member when said rims are moved toward each other to collapse said reel, and means to secure the inner ends of said spokes to said hub member adjacent the inner periphery thereof when said reel is in operative position.

12. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniformly spaced spokes each pivotally attached adjacent its outer end to a rim, each spoke attached to one of said rims being disposed in alignment in an axial plane with a spoke attached to the other of said rims, each spoke being shaped to be secured adjacent its inner end to said hub member when said reel is in operative position, the inner end of each said spoke being adapted to move toward the axis of said hub member when said rims are moved toward each other to collapse said reel, and means to secure the inner end of each said pair of spokes to said hub member when said reel is in operative position.

13. A collapsible hose reel comprising, in combination, a pair of spaced, axially aligned rims of substantially equal diameter, an annular hub member of smaller diameter than said rims disposed intermediate said rims, in axial alignment therewith, and substantially equidistant therefrom, a plurality of substantially uniformly spaced spokes, each pivotally attached adjacent its outer end to a rim by being bent substantially therearound, each spoke attached to one of said rims being disposed in alignment in an axial plane with a spoke attached to the other of said rims, each spoke being shaped adjacent its inner end to cooperate with securing means to secure said spoke to said hub member adjacent the inner periphery thereof when said reel is in operative position, the inner end of each said spoke being adapted to move toward the axis of said hub member when said rims are moved toward each other to collapse said reel, and means to secure the inner ends of each pair of spokes to said hub member when said reel is in operative position.

14. A hose reel comprising, in combination, a pair of spaced, axially aligned rims of substantially equal diameter, an annular hub member of smaller diameter than said rims disposed intermediate said rims, in axial alignment therewith, and substantially equidistant therefrom, said hub member having a relatively wide outer periphery, a plurality of spaced spokes each attached adjacent its outer end to one of said rims, and means for securing each said spoke adjacent its inner end to said hub member, the spokes attached to one of said rims contacting with the outer periphery of said hub member substantially in a plane perpendicular to the axis of said hub member, the spokes attached to said other rim contacting with the periphery of said hub member at points spaced from said transverse plane and nearer said other rim, whereby to eliminate a sharp notch between the inner ends of the spokes attached to said respective rims.

In testimony whereof I affix my signature.

CORNELIUS D. HEFFERNAN.